(12) United States Patent
Morrissey et al.

(10) Patent No.: US 7,358,001 B2
(45) Date of Patent: Apr. 15, 2008

(54) PROCESS FOR OPERATING A REGENERATIVE FUEL CELL

(75) Inventors: Patrick John Morrissey, Middlesex (GB); Philip John Mitchell, Leicestershire (GB); Dominic Anthony Szanto, South Wales (GB); Norman John Ward, Oxfordshire (GB)

(73) Assignee: Regenesys Technology Limited, Wiltshire (GB)

( * ) Notice: Subject to any disclaimer, the term of this patent is extended or adjusted under 35 U.S.C. 154(b) by 333 days.

(21) Appl. No.: 10/469,578

(22) PCT Filed: Feb. 22, 2002

(86) PCT No.: PCT/GB02/00777

§ 371 (c)(1),
(2), (4) Date: Feb. 23, 2004

(87) PCT Pub. No.: WO02/071522

PCT Pub. Date: Sep. 12, 2002

(65) Prior Publication Data

US 2004/0142219 A1 Jul. 22, 2004

(30) Foreign Application Priority Data

Mar. 2, 2001 (GB) .................................. 0105246.3

(51) Int. Cl.
*H01M 8/04* (2006.01)
*H01M 8/24* (2006.01)
*H01M 2/38* (2006.01)
*H01M 2/36* (2006.01)
*H01M 4/36* (2006.01)

(52) U.S. Cl. .......................... 429/18; 429/14; 429/15; 429/51; 429/72; 429/105

(58) Field of Classification Search .................. 429/18
See application file for complete search history.

(56) References Cited

U.S. PATENT DOCUMENTS 4,485,154 A 11/1984 Remick et al.
5,439,757 A * 8/1995 Zito ............................ 429/51
5,612,148 A 3/1997 Zito

FOREIGN PATENT DOCUMENTS

| WO | WO 94/09522 | 4/1994 |
| WO | WO 94/09526 | 4/1994 |
| WO | WO 00/03448 | 1/2000 |
| WO | WO 01/03221 | 1/2001 |

OTHER PUBLICATIONS

International Search Report; International Application No. PCT/GB02/00777; mailed May 27, 2002.

* cited by examiner

*Primary Examiner*—Mark Ruthkosky
*Assistant Examiner*—Karie O'Neill
(74) *Attorney, Agent, or Firm*—Antonelli, Terry, Stout & Kraus, LLP.

(57) ABSTRACT

In the regenerative fuel cell, a positive chamber is separated from a negative chamber by a cation exchange membrane. The positive chamber comprises a positive electrode and a bromine-containing electrolyte. The negative chamber comprises a negative electrode and a sulfide-containing electrolyte. When the cell is in operation, the electrolytes are replenished using electrolyte from an electrolyte store (32, 34). In the method, the distribution of water between the two electrolytes is controlled by discharging the electrolyte(s), such that when the electrolytes are separated by a water permeable membrane (46), water will flow from the sulfide-containing electrolyte to the bromine-containing electrolyte by osmosis. The electrolytes are circulated through a container (43) which is divided by a water permeable membrane (46), under conditions wherein no current flows in the container between the two electrolytes.

9 Claims, 10 Drawing Sheets

PROCESS FOR OPERATING A REGENERATIVE FUEL CELL

Related Application

This application is a U.S. national phase application of international application No. PCT/GB02/00777 filed Feb. 22, 2002, which claims priority of Great Britain application No. GB 0105246.3 filed Mar. 2, 2001.

The present invention relates to the field of regenerative fuel cell (RFC) technology. In particular it relates to apparatus and methods for the operation of RFCs which enhance their performance characteristics.

The manner in which RFCs are able to store and deliver electricity is well known to those skilled in the art. An example of an RFC is described in U.S. Pat. No. 4,485,154 which discloses an electrically chargeable, anionically active, reduction-oxidation system using a sulfide/polysulfide reaction in one half of the cell and an iodine/iodide, chlorine/chloride or bromine/bromide reaction in the other half of the cell. The two halves of the cell are separated by a cation exchange membrane.

The overall chemical reaction involved, for example, for the bromine/bromide-sulfide/polysulfide system is shown in Equation 1 below:

$$Br_2 + S^{2-} \rightleftharpoons 2Br^- + S \quad \text{Equation 1}$$

Within an RFC such as that described in U.S. Pat. No. 4,485,154, the reaction takes place in separate but dependent bromine and sulfur half-cell reactions as shown below in Equations 2 and 3:

$$Br_2 + 2e^- \rightleftharpoons 2Br^- \quad \text{Equation 2}$$

$$S^{2-} \rightleftharpoons 2e^- + S \quad \text{Equation 3}$$

It should be noted however that these equations represent the overall reactive changes occurring in the RFC. In practice the reactions are complicated by the low basicity of sulfide which results in the formation of bisulfide as the active species, as shown in Equation 4.

$$S^{2-} + H_2O \rightleftharpoons HS^- + OH^- \quad \text{Equation 4}$$

Also, the sulfur produced in Equations 1 and 3 forms soluble polysulfide species in the presence of sulfide ions, as shown in Equation 5 (where x may be from 1 to 4).

$$S^{2-} + xS \rightleftharpoons S_{x+1}^{2-} \quad \text{Equation 5}$$

Also, free bromine is solubilised in the presence of bromide ions to form the tribromide ion, as shown in Equation 6

$$Br^- + Br_2 \rightleftharpoons Br_3^- \quad \text{Equation 6}$$

When the RFC is discharging, bromine is converted to bromide on the positive ($+^{ve}$) side of the membrane and sulfide is converted to polysulfide on the negative ($-^{ve}$) side of the membrane. Equation 1 goes from left to right and metal ions flow from the $-^{ve}$ side of the membrane to the $+^{ve}$ side of the membrane to complete the circuit. When the RFC is charging, bromide is converted to bromine on the $+^{ve}$ side of the membrane and polysulfide is converted to sulfide on the $-^{ve}$ side of the membrane. Equation 1 goes from right to left and metal ions flow from the $+^{ve}$ side of the membrane to the $-^{ve}$ side of the membrane to complete the circuit.

The discharge/charge cycle described above will be repeated many times during the lifetime of the RFC and in order for the RFC to work efficiently throughout its lifetime it is important that the distribution of water (which is the solvent for the reactions described above) between the two electrolytes is controlled.

In a RFC such as that described above there will inevitably be a shift of water molecules from the $+^{ve}$ side of the membrane to the $-^{ve}$ side of the membrane during the charge cycle. This is because the metal ions which flow from the $+^{ve}$ side to the $-^{ve}$ side during the charge cycle carry with them a salvation sphere made up of water molecules. Similarly, there will inevitably be a shift of water molecules from the $-^{ve}$ side of the membrane to the $+^{ve}$ side of the membrane during the discharge cycle as the metal ions and their salvation sphere flow back across the membrane. Thus, although water inevitably shifts backwards and forwards across the membrane during the charge/discharge cycle, in an ideal system there is no net change in the distribution of water after a complete cycle.

At the beginning of the RFC's lifetime the two electrolytes will be set up with the distribution of water between them fixed at the desired amount. The water distribution will usually be fixed such that, at the halfway point in the charge (or discharge) cycle, the electrolytes are osmotically balanced. Unfortunately, once the RFC begins to operate in its repeating discharge-charge cycle, factors may intervene which result in the occurrence of coulombic losses. That is to say, not all of the charge delivered to the RFC during the charge cycle is recovered during the discharge cycle. One of the results of such coulombic losses is that the water distribution between the electrolytes can become unbalanced, as explained below.

The factors which result in coulombic losses in the system will vary depending upon the identity of the reactive species within the electrolytes and on the manner in which the RFC is constructed and operated.

In the case of the bromine/bromide-sulfide/polysulfide RFC such as that described above, an important factor which results in coulombic loss is the diffusion of unwanted species across the membrane. Although a cation selective ion-exchange membrane is used, 100% permselectivity is not possible and during extended cycling of the cell some anionic species diffuse through the membrane. In particular, sulfide ions (largely present in the bisulfide form, HS$^-$) and polysulfide ions ($S_{x+1}^{2-}$, where x may be from 1 to 4) may diffuse from the sulfide/polysulfide electrolyte into the bromine/bromide electrolyte where they will be oxidised by the bromine to form sulfate ions as shown in equations 7 and 8 below:

$$HS^- + 4Br_2 + 4H_2O \rightarrow 8Br^- + SO_4^{2-} + 9H^+ \quad \text{Equation 7}$$

$$S_{x+1}^{2-} + (3x+4)Br_2 + (4x+4)H_2O \rightarrow (6x+8)Br^- + (x+1)SO_4^{2-} + (8x+8)H^+ \quad \text{Equation 8}$$

Imperfections other than diffusion through the membrane which could similarly contribute to the above process are ineffective sealing between cell compartments, or catastrophic failure of any of the cell separating components, each of which may result in crossover of the electrolytes between cell compartments.

In Equations 7 and 8, the oxidation of the sulfur species goes beyond that which occurs during normal operation of the RFC. That is to say, the sulfide and polysulfide ions are oxidised all the way to sulfate ions. Consequently, in the case of sulfide ion cross-over (Equation 7), four bromine molecules per sulfide ion are consumed rather than the one bromine molecule per sulfide ion which is normally consumed in the reaction scheme of Equation 1. Similar overconsumption of bromine results from polysulfide cross-over (Equation 8) although to a slightly lesser extent. As a result, the bromine/bromide electrolyte becomes discharged to a greater extent than the sulfide/polysulfide electrolyte. Thus, when the cell is discharging there is insufficient bromine present to react with all the sulfide ions present thereby preventing completion of the discharge cycle. As a result, the voltage generated by the cell begins to decline earlier in the discharge cycle than when the electrolytes are balanced. In effect, the reactions represented by Equations 7 and 8 result in the permanent conversion of some of the polysulfide ions to sulfide because not all of the polysulfide ions are recovered on discharge. Subsequent cycles repeat this process, further reducing the number of polysulfide ions present.

Another feature of RFCs which commonly leads to the occurrence of coulombic losses is the presence of shunt currents. These arise when the RFC is made up of many cells connected in series and the two electrolytes are pumped in parallel through the respective chambers of each cell. The potential difference which exists between the downstream electrolyte and the upstream electrolyte can result in the flow of charge through the pathway of a single electrolyte rather than across the membrane from one electrolyte to the other.

The net result of these processes is that, at a given current, the time required to completely charge the the RFC becomes greater than the time taken for it to discharge. Since the current is carried by the metal ions (and their accompanying solvation spheres) there are consequently more water molecules transferred from the bromine/bromide electrolyte to the sulfide/polysulfide electrolyte during the charge cycle than are returned back during the discharge cycle. That is to say, there is a net shift of water from the bromine/bromide electrolyte to the sulfide/polysulfide electrolyte. Whilst the water shift may be negligible for a single cycle, RFCs typically operate continuously for many cycles and this can result in a large water shift which presents significant problems in handling the electrolytes.

It would therefore be advantageous to provide a process for controlling the water shift such that the distribution of water between the electrolytes is maintained at, or returned to, its preferred state.

Accordingly, the present invention provides an electrochemical process for energy storage and/or power delivery comprising:
(i) maintaining and circulating electrolyte flows in a liquid system in which the active constituents are soluble in a single cell or in an array of repeating cell structures, each cell with a positive ($+^{ve}$) chamber containing a $+^{ve}$ electrode and a negative ($-^{ve}$) chamber containing a $-^{ve}$ electrode, the chambers being separated from one another by a cation exchange membrane, the electrolyte circulating in the $-^{ve}$ chamber of each cell during discharge containing a sulfide (electrolyte 1), and the electrolyte circulating in the $+^{ve}$ chamber during discharge containing bromine (electrolyte 2),
(ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit, and
(iii) controlling the distribution of water between the two electrolytes by a process comprising (a) discharging electrolytes 1 and/or 2, or fractions thereof, to such an extent that water will flow by osmosis from electrolyte 1 into electrolyte 2 when said electrolytes are separated by a water permeable membrane and (b) circulating electrolytes 1 and 2, or fractions thereof, through the first and second chambers respectively of a container which is divided by a water permeable membrane, under conditions wherein no current flows in said container between electrolytes 1 and 2.

The present invention also includes within its scope apparatus for carrying out a process as described above comprising:
(i) a single cell or an array of repeating cell structures, each cell comprising; a $+^{ve}$ chamber containing a $+^{ve}$ electrode and a $-^{ve}$ chamber containing a $-^{ve}$ electrode the chambers being separated from one another by an ion exchange membrane, an electrolyte circulating in the $-^{ve}$ chamber of each cell which contains a sulfide during discharge (electrolyte 1), and an electrolyte circulating in the $+^{ve}$ chamber which contains bromine during discharge (electrolyte 2),
(ii) storage and circulation means for each electrolyte for restoring or replenishing the electrolytes in the $+^{ve}$ and $-^{ve}$ chambers,
(iii) means for controlling the distribution of water between the two electrolytes comprising; means for discharging electrolytes 1 and/or 2, or fractions thereof, to such an extent that water will flow by osmosis from electrolyte 1 into electrolyte 2 when said electrolytes are separated by a water permeable membrane; a container which is divided into first and second chambers by a water permeable membrane; and means for circulating electrolytes 1 and 2, or fractions thereof, respectively through the first and second chambers of the container under conditions wherein no current flows in said container between electrolytes 1 and 2.

Upon circulation of the electrolytes through the chambers of the divided container, water will flow by osmosis from electrolyte 1 (the sulfide/polysulfide electrolyte) through the water permeable membrane into electrolyte 2 (the bromine/bromide electrolyte) thus returning the water which has shifted across the cation exchange membrane during extended cycling of the RFC.

It is necessary to discharge one or both of electrolytes 1 and 2 prior to effecting the osmotic redistribution of water because discharging electrolyte 2 increases its ionic strength (bromine is converted to bromide) and discharging electrolyte 1 decreases its ionic strength (sulfide is converted to polysulfide). This creates the difference in ionic strength required to ensure that water flows from 1 to 2 and not vice versa. In a preferred embodiment, electrolyte 1 is completely discharged so as to provide the lowest possible ionic strength for electrolyte 1. In another preferred embodiment, electrolyte 2 is completely discharged so as to provide the highest possible ionic strength for electrolyte 2. In a particularly preferred embodiment, both electrolytes 1 and 2 are completely discharged so as to provide the greatest possible difference in ionic strength between electrolytes 1 and 2, thereby maximising the rate of flow of water from 1 to 2 and improving the efficiency of the redistribution process.

It is necessary to carry out step (iii) (b) of the process under conditions wherein no current flows between electrolytes 1 and 2 as they pass through the container so that the ionic strength of said electrolytes does not vary during this step (for reasons other than the desired redistribution of water). It should be noted that this does not necessarily mean that current may not flow between electrolytes 1 and 2 in other parts of the RFC system during the process of the present invention.

Suitable water permeable membranes are those which permit the transfer by osmosis of water from electrolyte 1 to electrolyte 2 but which substantially prevent the transfer of the reactive ingredients of the electrolytes (i.e. bromine/bromide and/or sulfide/polysulfide). The water permeable membrane of step (iii) may be the same as the cation exchange membrane used in the cells described in step (i). However, since no current flows across the water permeable membrane during step (iii) (b) it is possible to use a different membrane structure with characteristics more suited to the transfer of water than the transfer of cations. Examples of suitable water permeable membranes include, but are not limited to membranes commonly used in reverse osmosis, nanofiltration and cation exchange.

Whilst the process of the present invention may be carried out on the entire volumes of the electrolytes, this reduces the operational availability of the RFC due to the necessity of conducting the process under conditions of zero current flow. It is therefore preferable for step (iii)(b), or steps (iii)(a) and (iii)(b) of the process to be carried out on fractions of the total volume of each of the electrolytes which are removed from, and subsequently returned to, the main streams of electrolytes circulating throughout the RFC.

In this regard, step (iii) of the process may be applied as a batch process to a RFC operating in accordance with steps (i) and (ii). Thus, fractions of the bromine/bromide electrolyte (electrolyte 1) and sulfide/polysulfide electrolyte (electrolyte 2) are removed from the RFC main streams when sufficiently discharged. Thus, step (iii)(a) occurs within the RFC itself as a part of its normal discharge cycle. Electrolytes 1 and 2 are then treated in separate apparatus suitable for carrying out step (iii) (b) of the process before being returned to the RFC.

Thus, in one embodiment, fractions of electrolytes 1 and 2 are removed from the main streams of the RFC at, or close to, the end of the discharge cycle. These two fractions, which may be stored in separate tanks, are then circulated through the first and second chambers respectively of a container which is divided by a water permeable membrane, under conditions wherein no current flows between electrolytes. When the desired amount of water transfer from electrolyte 1 to electrolyte 2 has taken place, the fractions can be returned to their respective main streams within the RFC.

In this embodiment, with regard to the apparatus described above as suitable for carrying out the process of the present invention, the "means for discharging electrolytes 1 and/or 2" is the RFC itself.

Alternatively, the process may be applied continuously to the RFC wherein side streams of the bromine/bromide and sulfide/polysulfide electrolytes drawn continuously from the main streams of the RFC are diverted through apparatus suitable for carrying out both steps (iii)(a) and (iii)(b) of the process before being returned to the RFC.

Thus, in one embodiment, fractions of electrolytes 1 and 2 are removed from the main streams of the RFC at any point in the charge/discharge cycle. One or both fractions of electrolytes 1 and 2 are then discharged to a sufficient extent by means of an auxiliary electrochemical cell and are then circulated through the first and second chambers respectively of a container which is divided by a water permeable membrane, under conditions wherein no current flows between the electrolytes. When the desired amount of water transfer from electrolyte 1 to electrolyte 2 has taken place, the fractions can be returned to their respective main streams.

In this embodiment, with regard to the apparatus described above as suitable for carrying out the process of the present invention, the "means for discharging electrolytes 1 and/or 2" is provided by way of an auxiliary electrochemical cell.

The process and apparatus of the present invention may be advantageously combined with the processes and apparatus described in the applicants patent application Nos. PCT/GB99/02103 (published as WO00/03448) and/or PCT/GB00/02536 (published as WO01/03221) so as to provide a complete electrolyte management system. Suitable embodiments of such a system are illustrated in the figures and described in detail below.

In another aspect, the present invention also provides for the use, in a process for energy storage and/or power delivery comprising:

(i) maintaining and circulating electrolyte flows in a liquid system in which the active constituents are soluble in a single cell or in an array of repeating cell structures, each cell with a positive ($+^{ve}$) chamber containing a $+^{ve}$ electrode and a negative ($-^{ve}$) chamber containing a $-^{ve}$ electrode, the chambers being separated from one another by a cation exchange membrane, the electrolyte circulating in the $-^{ve}$ chamber of each cell during discharge containing a sulfide (electrolyte 1), and the electrolyte circulating in the $+^{ve}$ chamber during discharge containing bromine (electrolyte 2), and (ii) restoring or replenishing the electrolytes in the $+^{ve}$ and $-^{ve}$ chambers by circulating the electrolyte from each chamber to storage means comprising a volume of electrolyte greater than the cell volume for extended delivery of power over a longer discharge cycle than the cell volume alone would permit;

of a process comprising:

(a) discharging electrolytes 1 and/or 2, or fractions thereof, to such an extent that water will flow by osmosis from electrolyte 1 into electrolyte 2 when said electrolytes are separated by a water permeable membrane, and (b) circulating the discharged electrolytes 1 and 2, or fractions thereof, through the first and second chambers respectively of a container which is divided by a water permeable membrane, under conditions wherein no current flows in said container between electrolytes 1 and 2;

for the purpose of controlling the distribution of water between the two electrolytes.

The present invention will be further described with reference to the accompanying drawings in which.

Figure 1A:
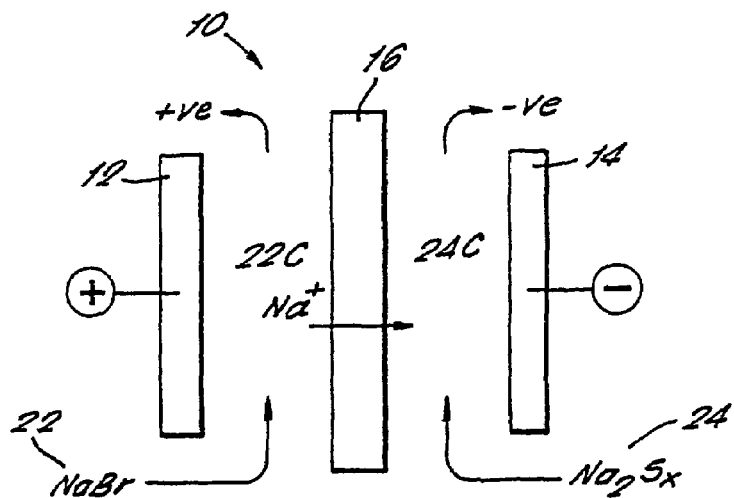
FIG. 1A is a schematic view of a basic electrochemical reduction-oxidation cell in which a sulfide/polysulfide reaction is carried out in one half of the cell and a bromine/bromide reaction is carried out in the other half of the cell.

FIG. 1A shows a cell 10 with a positive ($+^{ve}$) electrode 12 and a negative ($-^{ve}$) electrode 14 and a cation exchange membrane 16 which may be formed from a fluorocarbon polymer with sulfonic acid functional groups to provide charge carriers. The membrane 16 acts to separate the $+^{ve}$ and $-^{ve}$ sides of the cell 10 and is selected to minimize migration of bromine from the $+^{ve}$ side to the $-^{ve}$ side and to minimize migration of sulfide and polysulfide ions from the $-^{ve}$ side to the $+^{ve}$ side. An aqueous solution 22 of NaBr is provided in a chamber 22C formed between the $+^{ve}$ electrode 12 and the membrane 16 and an aqueous solution 24 of $Na_2S_x$, (where x may be from 2 to 5) is provided in a chamber 24C formed between the $-^{ve}$ electrode 14 and the membrane 16. A $K_2S_x$ solution, which is more soluble and more expensive than the $Na_2S_x$ solutions, is used in another embodiment.

When the cell is in the discharged state, a solution of NaBr of up to 6.0 molar concentration exists in the chamber 22C of the cell and a solution of $Na_2S_x$ at 0.5 to 1.5 molar, exists in chamber 24C of the cell. Higher molarity is possible with $K_2S_x$.

As the cell is charged, $Na^+$ ions are transported through the cation membrane 16, as shown in FIG. 1A, from the $+^{ve}$ to the $-^{ve}$ side of the cell. Free bromine is produced via oxidation of the bromide ions at the $+^{ve}$ electrode and dissolves as a tribromide or pentabromide ion. Sulfur is reduced at the $-^{ve}$ electrode and the polysulfide, $Na_2S_x$, salt eventually becomes the monosulfide as the charging proceeds to completion. At the $+^{ve}$ side the following reaction occurs,

and at the $-^{ve}$ side the following reaction occurs,

The membrane separates the two electrolytes and prevents bulk mixing and also retards the migration of sulfide and polysulfide ions from the $-^{ve}$ side to the $+^{ve}$ side, and the migration of $Br^-$ and $Br_2$ from the $+^{ve}$ to the $-^{ve}$ side. Diffusion of the sulfide and polysulfide ions across the membrane results in coulombic losses and water shift as described earlier.

When providing power, the cell is discharging. During this action, reversible reactions occur at the two electrodes. At the $+^{ve}$ side electrode 12, bromine is reduced to $Br^-$, and at the $-^{ve}$ electrode, the $S^{2-}$ ion is oxidized to molecular S. The electrons produced at the $-^{ve}$ electrode form the current through a load. The chemical reaction at the $+^{ve}$ electrode produces 1.06 to 1.09 volts and the chemical reaction at the $-^{ve}$ electrode produces 0.48 to 0.52 volts. The combined chemical reactions produce an open circuit voltage of 1.54 to 1.61 volts per cell.

The present system is an anionically active electrochemical system. Therefore, the cation which is associated with them essentially takes no part in the energy producing process. Hence, a cation of "convenience" is chosen. Sodium or potassium are preferred choices. Sodium and potassium compounds are plentiful, they are inexpensive and have high water solubilities. Lithium and ammonium salts are also possibilities, but at higher costs.

Figure 1B:
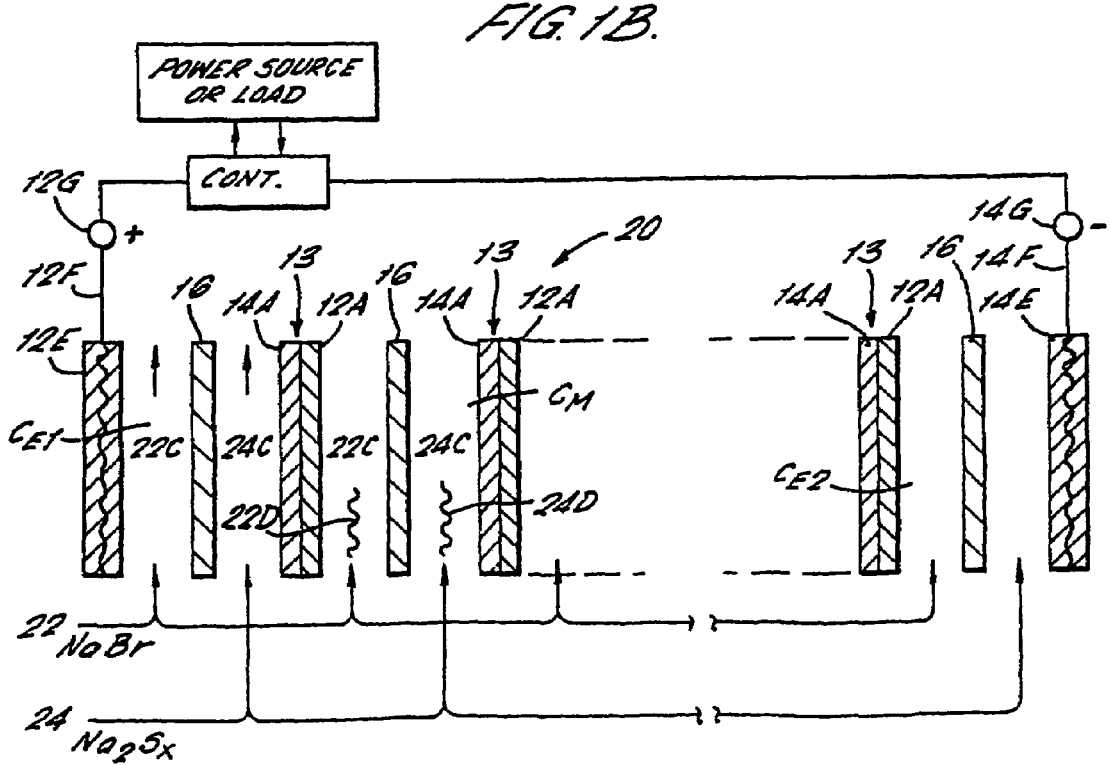
FIG. 1B is a diagram of cell arrays using the system of FIG. 1A.

FIG. 1B shows an array 20 of multiple cells connected in electrical series and fluid parallel. Multiple mid-electrodes 13 (each one having a $+^{ve}$ electrode side 12A and $-^{ve}$ electrode side 14A) and end electrodes 12E ($+^{ve}$) and 14E ($-^{ve}$) are spaced out from each other by membranes 16 and, optionally, screen or mesh spacers (22D, 24D) in all the cell chambers 22C, 24C, (portions of two of which 22D, 24D are shown by way of example) to form end cells $C_{E1}$, and $C_{E2}$ and an array of mid cells $C_M$ (typically 10-20; but note much smaller and much higher numbers of cells can be accommodated). The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) may be used to drive a vehicle) or power sources (e.g. utility power grid when used as a load-levelling device).

Figure 2:
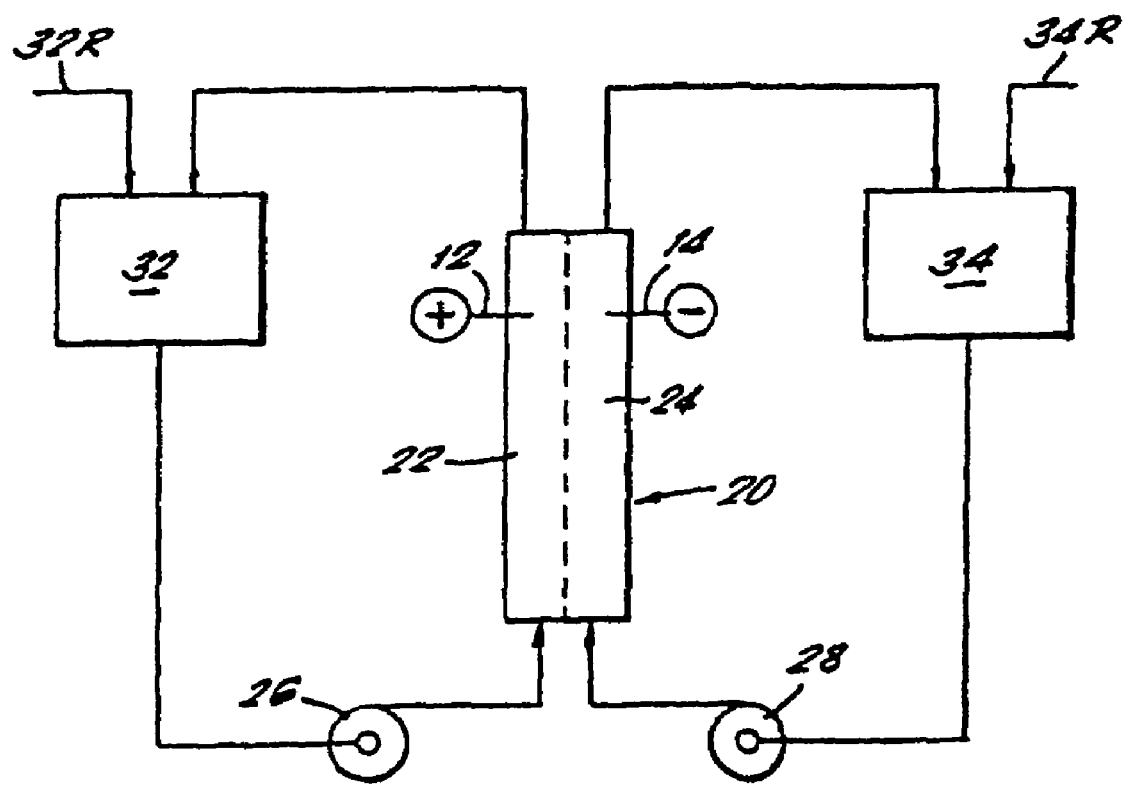
FIG. 2 is a flow diagram of a fluid flow system using the cell of FIG. 1A or cell array of FIG. 1B.

FIG. 2 shows a free flow system, a power generation/storage system utilizing one or more of the batteries or cell array formats 20. Each cell 20 receives electrolyte through pumps 26 and 28 for the NaBr and $Na_2S_x$ solutions (22 and 24, respectively). The electrolytes 22 and 24 are stored in containers 32 and 34. The tanks 32, 34 can be replaced with freshly charged electrolyte by substituting tanks containing fresh electrolyte and/or refilling them from charged supply sources via lines 32R, 34R with corresponding lines (not shown) provided for draining spent (discharged) reagent. The electrolytes 22 and 24 are pumped from tanks 32 and 34, respectively, into the respective chambers 22C and 24C by means of pumps 26 and 28.

Figure 3:
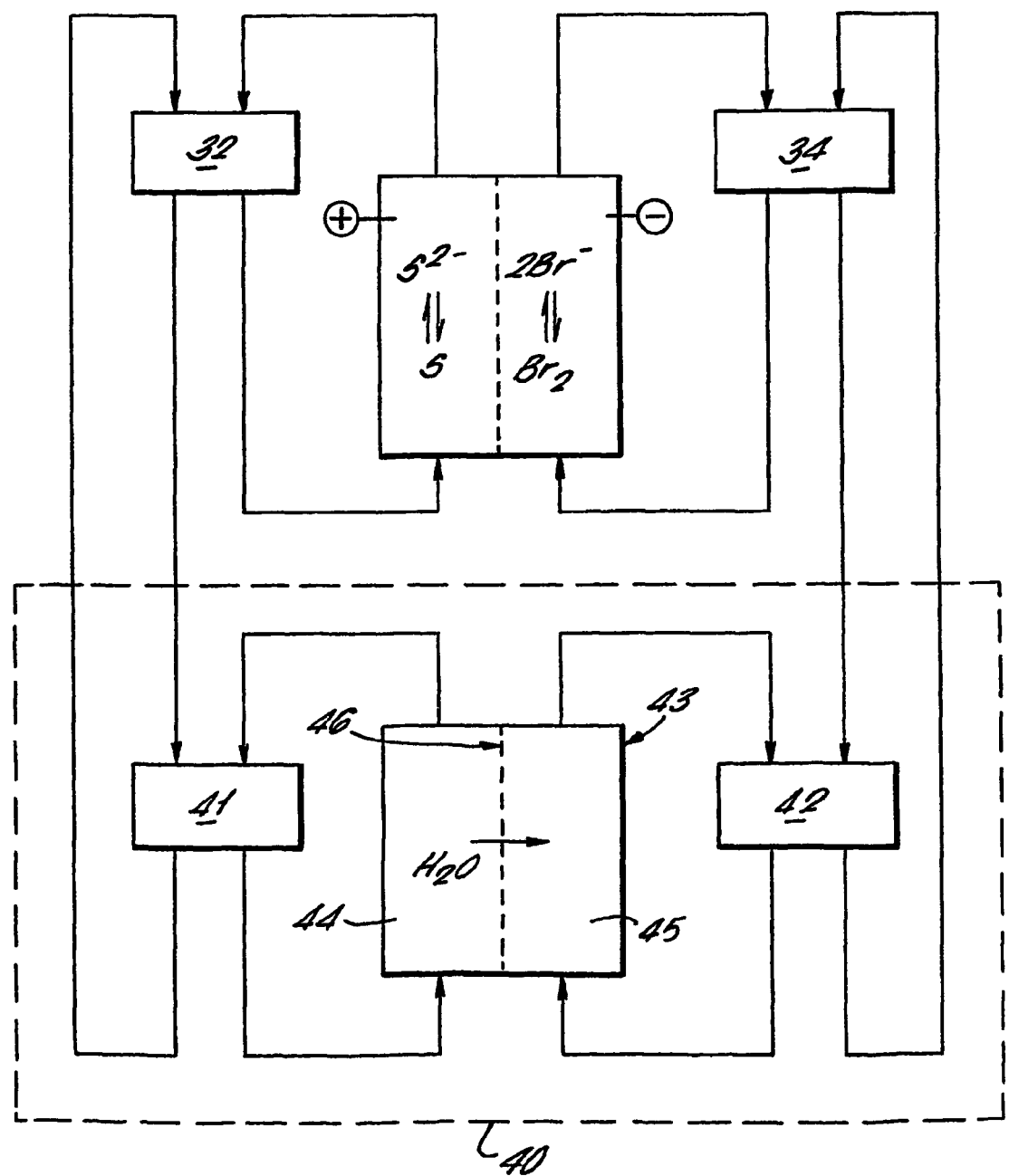
FIG. 3 is a flow diagram of an apparatus for carrying out the process of the present invention as a batch process.

FIG. 3 shows a free flow system comprising a power generation/storage system as illustrated in FIG. 2 and a water balance system 40. Fractions of the sulfide/polysulfide electrolyte (electrolyte 1) and the bromine/bromide electrolyte (electrolyte 2) are taken from tanks 32 and 34 respectively at a point in the charge/discharge cycle when the electrolytes are sufficiently discharged, preferably at or near the end of the discharge cycle. The electrolyte fractions are passed to tanks 41 and 42. Electrolytes 1 and 2 are then circulated through chambers 44 and 45 respectively of a container 43 which is divided by a water permeable membrane 46. It will be appreciated by a person skilled in the art that an array of containers 43 arranged in series may advantageously be used in this and the other embodiments described herein. The relative difference in ionic strength between the electrolytes means that water will flow by osmosis through the water permeable membrane from electrolyte 1 into electrolyte 2. When sufficient water transfer has occurred the electrolytes 1 and 2 are returned to tanks 32 and 34 respectively. This system can only be used in a batch proc because electrolytes 1 and 2 can only be removed when they are sufficiently discharged.

Figure 4:
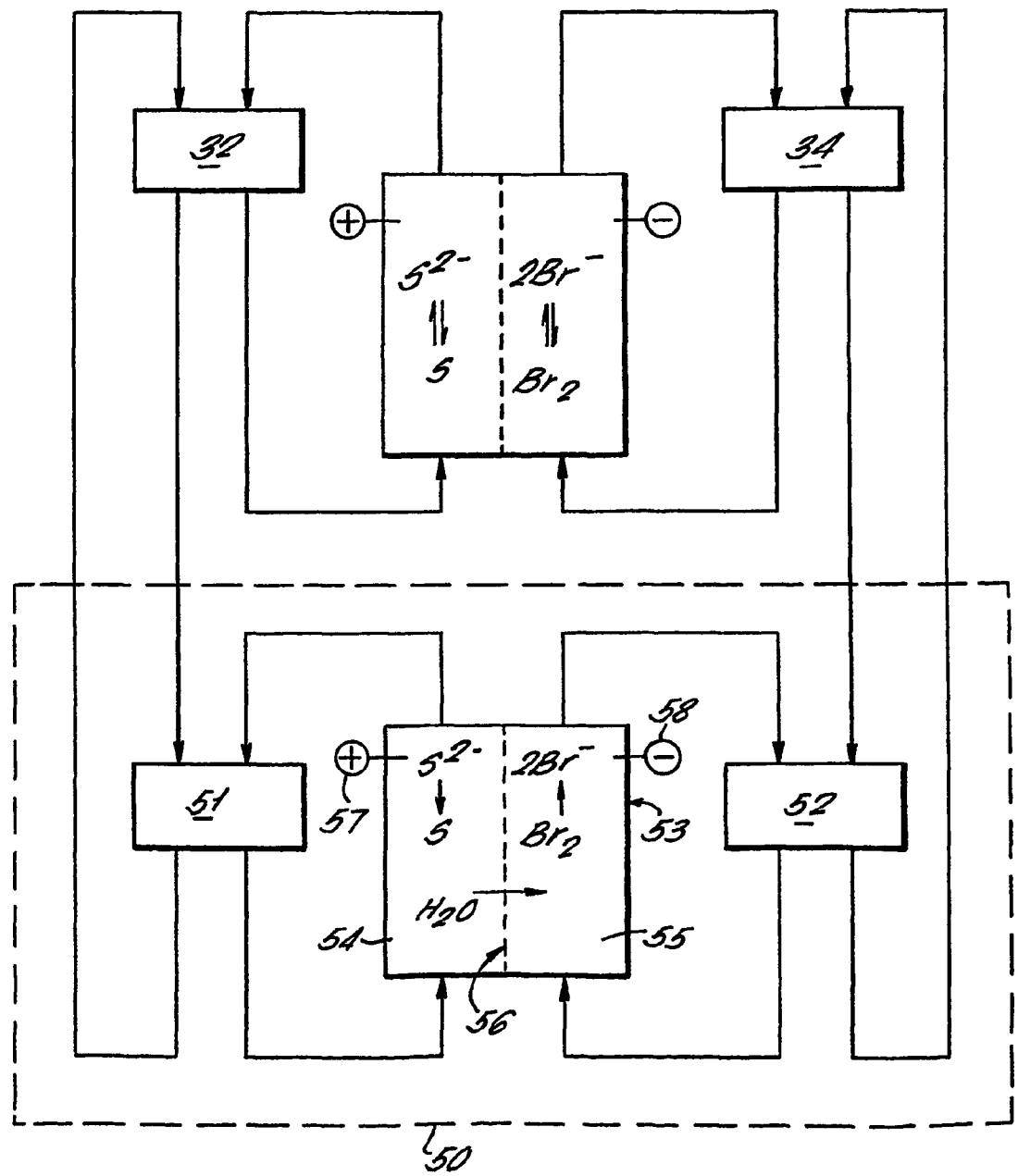
FIG. 4 is a flow diagram of an apparatus for carrying out the process of the present invention as a continuous process.

FIG. 4 shows an alternative free flow system comprising a power generation/storage system as illustrated in FIG. 2 and an alternative water balance system 50. This embodiment differs from FIG. 3 in that the water balance system 50 comprises a container 53 which also functions as an auxiliary electrochemical cell. In this embodiment fractions of the sulfide/polysulfide electrolyte (electrolyte 1) and the bromine/bromide electrolyte (electrolyte 2) are taken from tanks 32 and 34 respectively at any point in the charge/ discharge cycle, but still preferably at or near the end of the discharge cycle. The electrolytes are passed to tanks 51 and 52. Electrolytes 1 and 2 are then circulated through chambers 54 and 55 respectively of the container 53 which is divided by a water permeable membrane 56. It will be appreciated by a person skilled in the art the an array of containers 53 arranged in series may advantageously be used in this and the other embodiments described herein. In the present embodiment the water permeable membrane 56 is also a cation exchange membrane (for example like membrane 16 used in the main RFC system) and the container additionally comprises electrodes 57 and 58 so that the container may function as a cell in the same manner as the cell (or cells) of the main RFC system. Current is passed through the container so as to completely discharge electrolytes 1 and 2 as they circulate through chambers 54 and 55. The current is then switched off and circulation of the electrolytes continues. The relative difference in ionic strength between the electrolytes means that water will flow by osmosis through the water permeable membrane from electrolyte 1 into electrolyte 2. When sufficient water transfer has occurred the electrolytes 1 and 2 are returned to tanks 32 and 34 respectively. This system can be used in a batch or continuous process because electrolytes 1 and 2 can be removed from the main system at any point in the charge/discharge.

Figure 5:
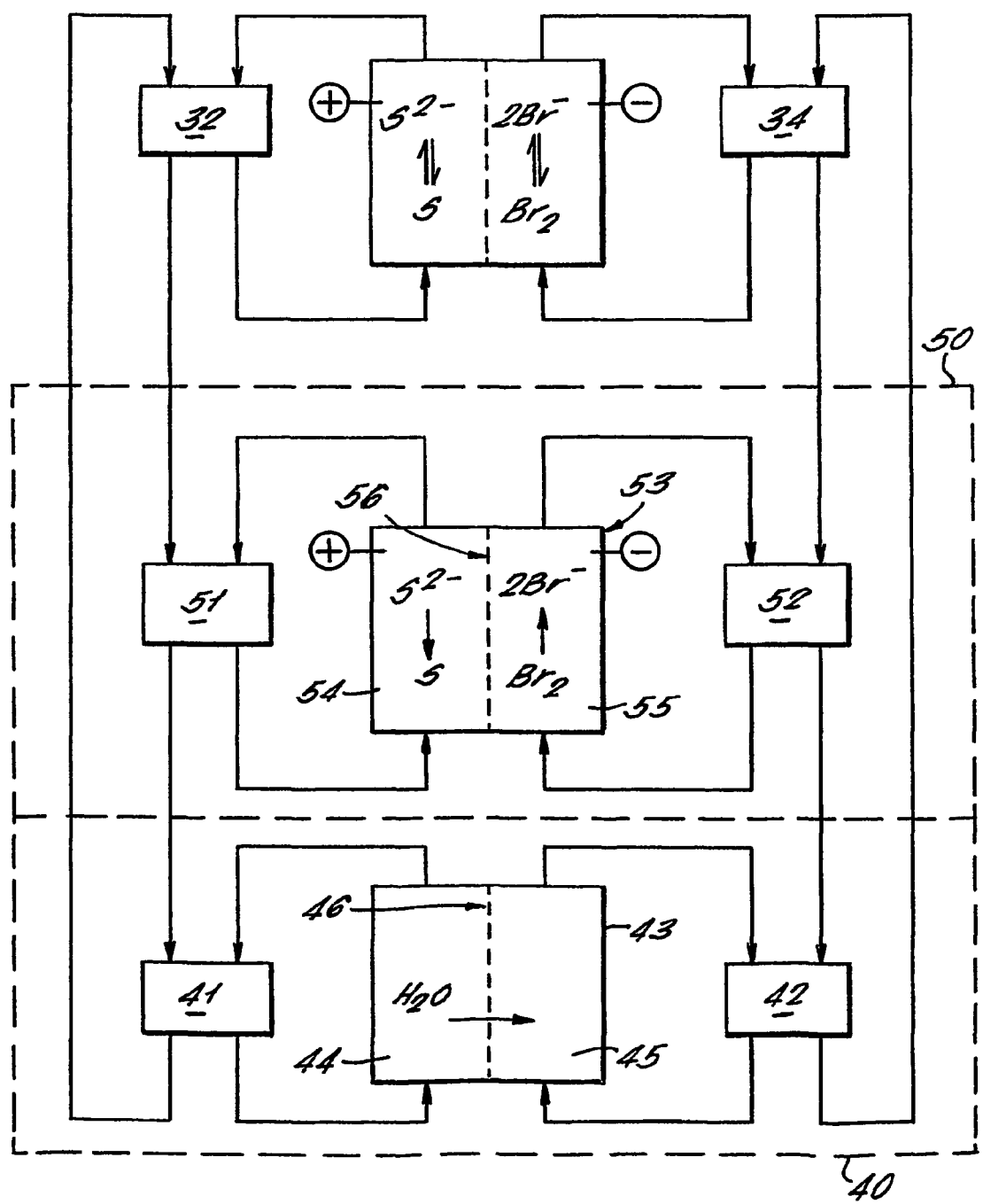
FIG. 5 is a flow diagram of an apparatus for carrying out the process of the present invention as a continuous process.

FIG. 5 shows an alternative free flow system which is essentially a combination of FIGS. 3 and 4. In this embodiment, fractions of the sulfide/polysulfide electrolyte (electrolyte 1) and the bromine/bromide electrolyte (electrolyte 2) are taken from tanks 32 and 34 respectively at any point in the charge/discharge cycle, but still preferably at or near the end of the discharge cycle. The electrolytes are passed to tanks 51 and 52. Electrolytes 1 and 2 are then circulated through chambers 54 and 55 respectively of a container 53 which is divided by a water permeable membrane 56 which is also a cation exchange membrane. The container additionally comprises electrodes 57 and 58 so that the container may function as a cell in the same manner as the cell (or cells) of the main RFC system. Current is passed through the container/cell so as to completely discharge electrolytes 1 and 2 as they circulate through chambers 54 and 55. Rather than switch the current off and continue circulation within system 50 (as occurs in the embodiment of FIG. 4), electrolytes 1 and 2 are passed to tanks 41 and 42 respectively. Electrolytes 1 and 2 are then circulated through chambers 44 and 45 respectively of a container 43 which is divided by a water permeable membrane 46. The relative difference in ionic strength between the electrolytes means that water will flow by osmosis through the water permeable membrane from electrolyte 1 into electrolyte 2. When sufficient water transfer has occurred the electrolytes 1 and 2 are returned to tanks 32 and 34 respectively. This embodiment can also be used in a batch or continuous process because electrolytes 1 and 2 can be removed from the main system at any point in the charge/discharge. It has an advantage over the embodiment of FIG. 3 in that it is not necessary to interrupt the flow of current through the auxiliary electrochemical cell 53 in order to allow water transfer. Water transfer occurs in a separate system 40 and the water permeable membrane 46 can be selected according the its ability to effect water transfer without the constraints of having to function as a cation exchange membrane as well.

Figure 6:
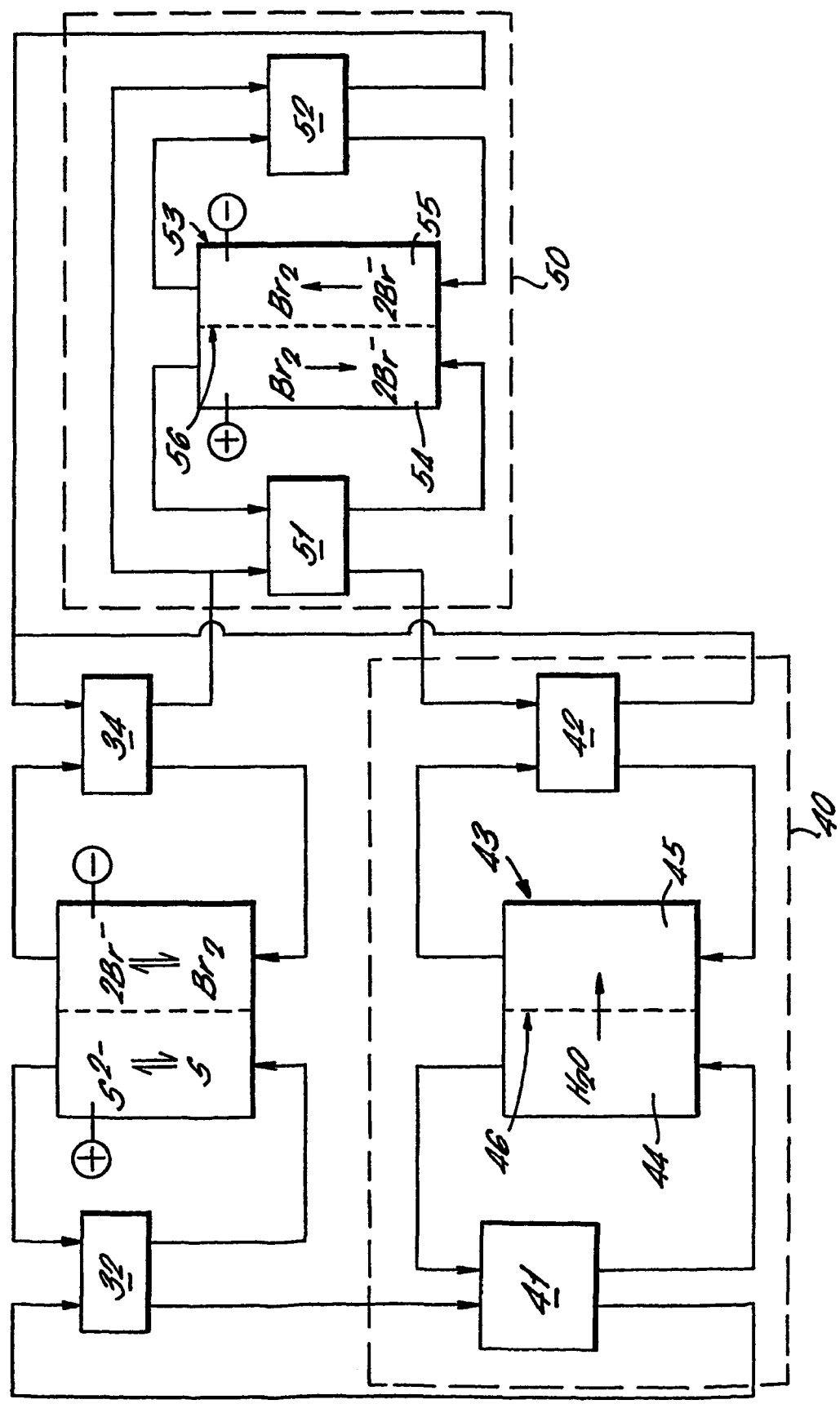
FIG. 6 is a flow diagram of an apparatus for carrying out the process of the present invention as a continuous process.

FIG. 6 shows an alternative free flow system which operates on a similar principle to the embodiment of FIG. 5. In this case only the bromine/bromide electrolyte is discharged in order to create the necessary difference in ionic strength between the electrolytes. As in FIG. 5, an auxiliary electrochemical cell is again used to effect the discharge. In this embodiment fractions of the bromine/bromide electrolyte (electrolyte 2) are taken from tank 34 at any point in the charge/discharge cycle, but still preferably at or near the end of the discharge cycle. The electrolyte is passed to tanks 51 and 52. Electrolyte 2 is then circulated through chambers 54 and 55 respectively of a container 53 which is divided by a cation exchange membrane 56. The container additionally comprises electrodes 57 and 58 so that the container functions as a cell. Current is passed through the container so as to discharge electrolyte 2 as it circulates through chamber 54 and to charge electrolyte 2 as it circulates through chamber 55. It will be apparent to a person skilled in the art that oxidisable electrolytes other than electrolyte 2 could be circulated from tank 52 through chamber 55 of container/cell 53 in order to effect discharge of electrolyte 2 which circulates through chamber 54. However, it is preferred to use a fraction of electrolyte 2 taken from tank 34 because this results in said fraction being charged to some degree. Electrolyte 2 which circulated through chamber 55 is returned to tank 34 whilst electrolyte 2 which circulated through chamber 54 is passed to tank 42 of the water balance system 40. Electrolyte 2 is then circulated through chamber 45 of container 43 which is divided by a water permeable membrane 46. Electrolyte 1 taken from tank 32 of the main system is transferred to holding tank 41 and from there circulated through chamber 44 before being returned to tank 32. The relative difference in ionic strength between the electrolytes means that water will flow by osmosis through the water permeable membrane from electrolyte 1 into electrolyte 2. When sufficient water transfer has occurred the electrolyte 2 is returned to tank 34. This embodiment can also be used in a batch or continuous process because electrolytes 1 and 2 can be removed from the main system at any point in the charge/discharge.

Figure 7:
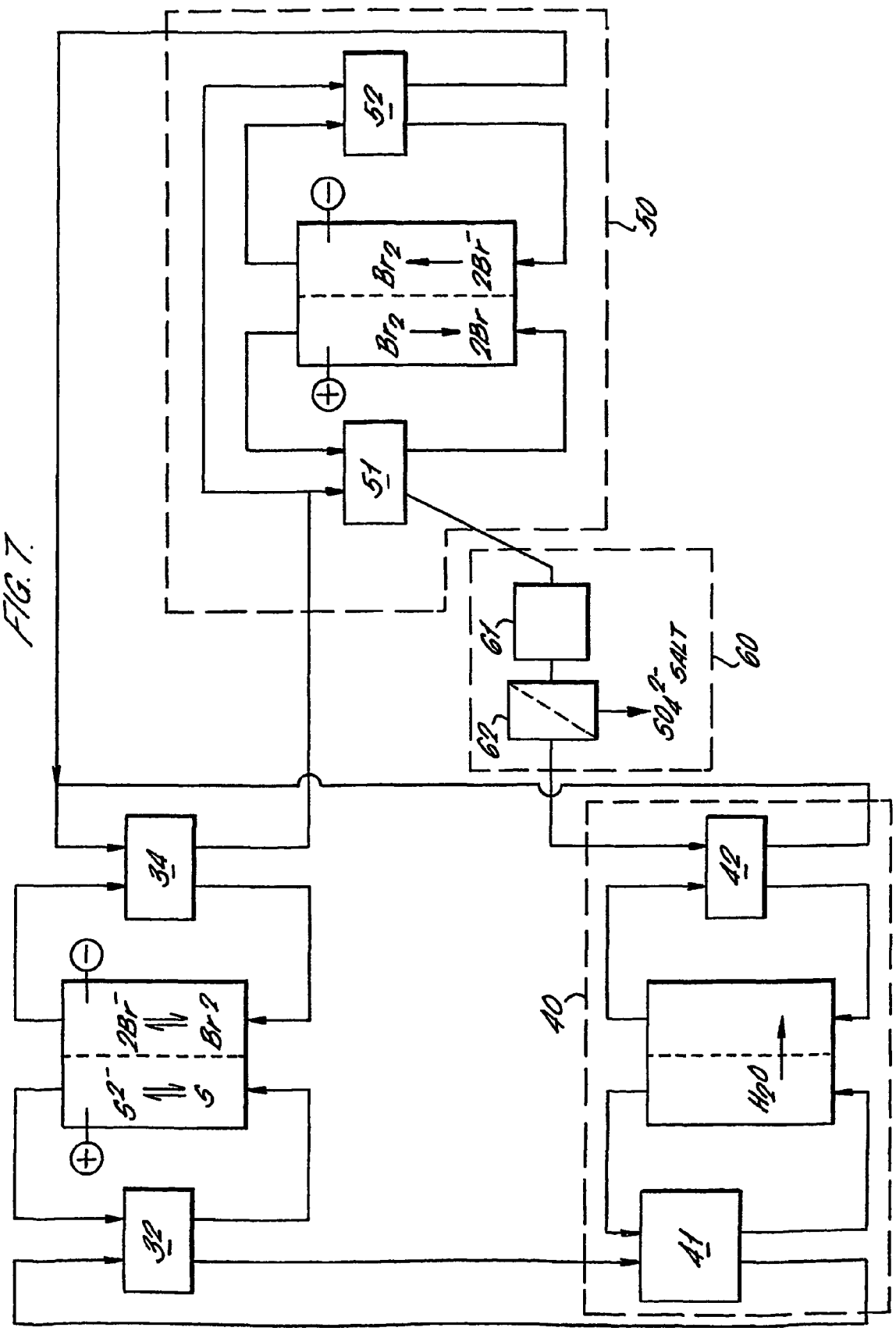
FIG. 7 is a flow diagram of an apparatus for carrying out the process of the present invention as a continuous process, including means for effecting sulfate removal.

FIG. 7 shows an embodiment which works in the same manner as the embodiment of FIG. 6. In addition, between tanks 51 and 42 there is included a sulfate removal system 60 which comprises a crystalliser 61 and a filter 62. This embodiment therefore combines the water balance advantages of the present invention with the advantages of the process for the removal of sulfate ions from electrolyte 1 which is described in the applicants International Patent Application No GB99/02103 (published as WO00/03448).

Figure 8:
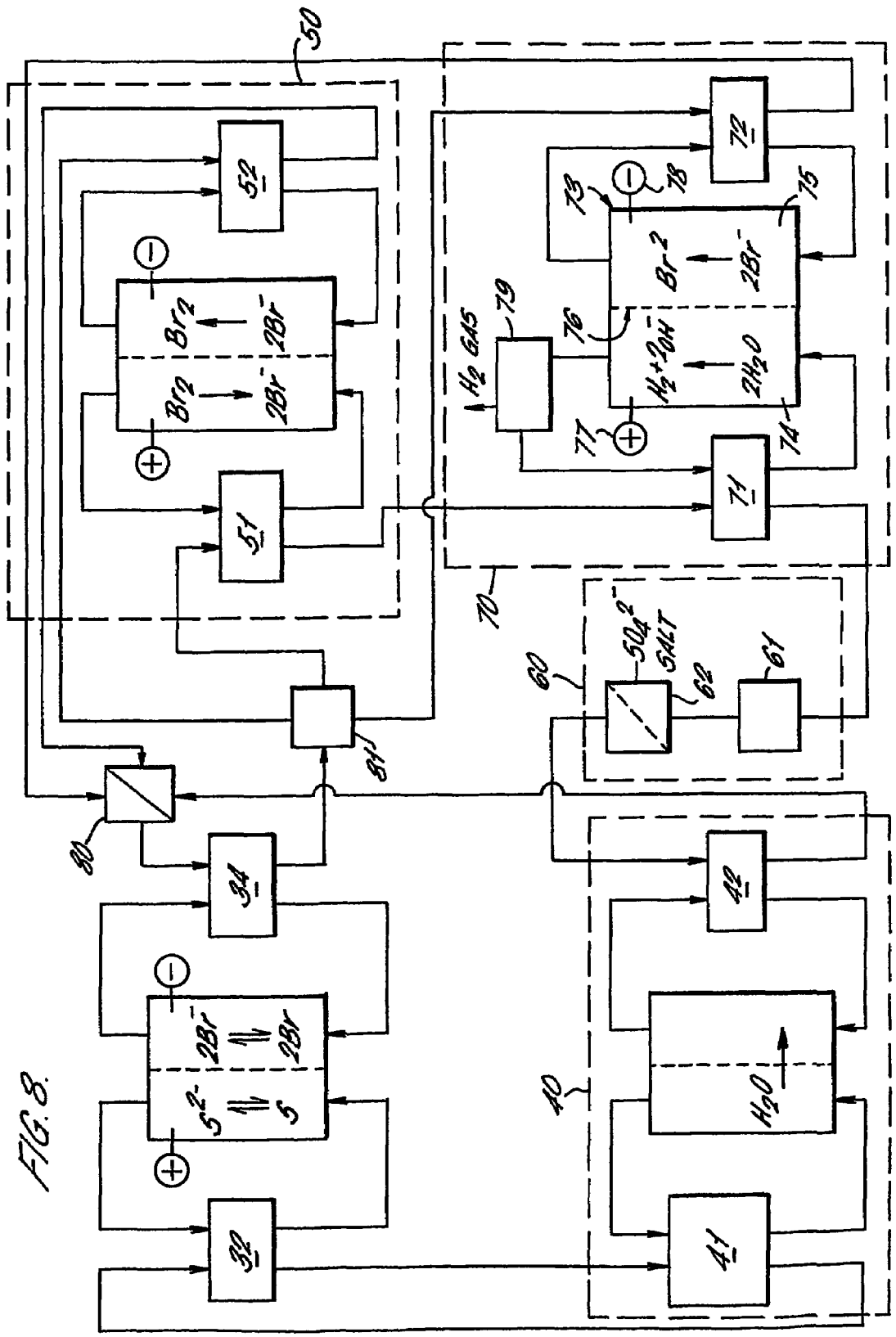
FIG. 8 is a flow diagram of an apparatus for carrying out the process of the present invention as a continuous process, including means for effecting sulfate removal and means for rebalancing the electrolytes.

FIG. 8 shows an embodiment which works in the same manner as the embodiment of FIG. 7. In addition, between the auxiliary electrochemical cell 50 and the sulfate removal system 60 there is included a further auxiliary cell 70. Electrolyte 2 from tank 51 passes to tank 71 from which it is circulated through chamber 74 of container 73 which is divided by a cation exchange membrane 76. The electrolyte circulating through chamber 75 is a fraction of electrolyte 2 taken from tank 34 via a three way distributor 81 and stored in tank 72. When a current is applied to the cell via electrodes 77 and 78, bromide ions contained in electrolyte 2 circulating through chamber 75 are oxidised to bromine. This charges the fraction of electrolyte 2 taken from tank 34 and helps to rebalance the state of charge of the electrolytes of the RFC system as explained in the applicants International Patent Application No GB99/02103 (published as WO01/03221). Electrolyte 2 which circulates through chamber 74 is however free from bromine molecules due to the discharging process effected by auxiliary electrochemical cell 50. Thus the next reducible species present in the electrolyte is water which is reduced to hydrogen gas and hydroxide ions. Electrolyte 2 passes from chamber 74 to tank 79 from which hydrogen gas may be vented prior to returning electrolyte 2 to tank 71. From tank 71, electrolyte 2 passes through the sulfate removal system 60 and onto the water balance system 40 prior to returning to tank 34 of the main RFC system via a header tank 80 which collects electrolyte 2 from tanks 42, 52 and 72. The inclusion of the further auxiliary cell is not only advantageous due to the beneficial effect it has on rebalancing the state of charge of the electrolytes. It is also beneficial because it results in an increase in the ionic strength of the fraction of electrolyte 2 which passes through chamber 74. This promotes crytallisation of sulfate salts in the sulfate removal system 60 and also promotes the transfer of water in the water balance system 40. This embodiment therefore combines (and enhances) the water balance advantages of the present invention with the advantages of the process for the removal of sulfate ions from electrolyte 1 which is described in the applicants International Patent Application No GB99/02103 (published as WO00/03448) and also with the advantages of the electrolyte rebalancing system which is described in the applicants International Patent Application No GB00/02536 (published as WO01/03221). It will be appreciated that the presence of the sulfate removal system 60 is not essential to the invention and a further embodiment equivalent to that illustrated in FIG. 8 but excluding such system would also be advantageous.

It will be appreciated by the person skilled in the art that further embodiments may be described and the present invention is not intended to be limited to those described herein.

EXAMPLE 1

A regenerative fuel cell of the type described above with reference to FIGS. 1A, 1B and 2 having sulfide/polysulfide and bromine/bromide electrolytes was set up. The starting composition of the sulfide/polysulfide electrolyte was $Na_2S_{3.7}$ (1.3M), NaOH (1M) and NaBr (1M). The starting composition of the bromine/bromide electrolyte was NaBr (5M). The cell had the following specifications:

| Electrode material: | polyethylene impregnated with activated carbon. |
|---|---|
| Electrode area: | 140 $m^2$. |
| Current density: | 60 $mA/cm^2$. |
| Electrolyte volume: | 23,000 litres per electrolyte |
| Cycle time: | 4.5 hrs |
| Flow rate: | 136 l/hr |
| Membrane material: | Nafion ™ 115 |

Figure 9:
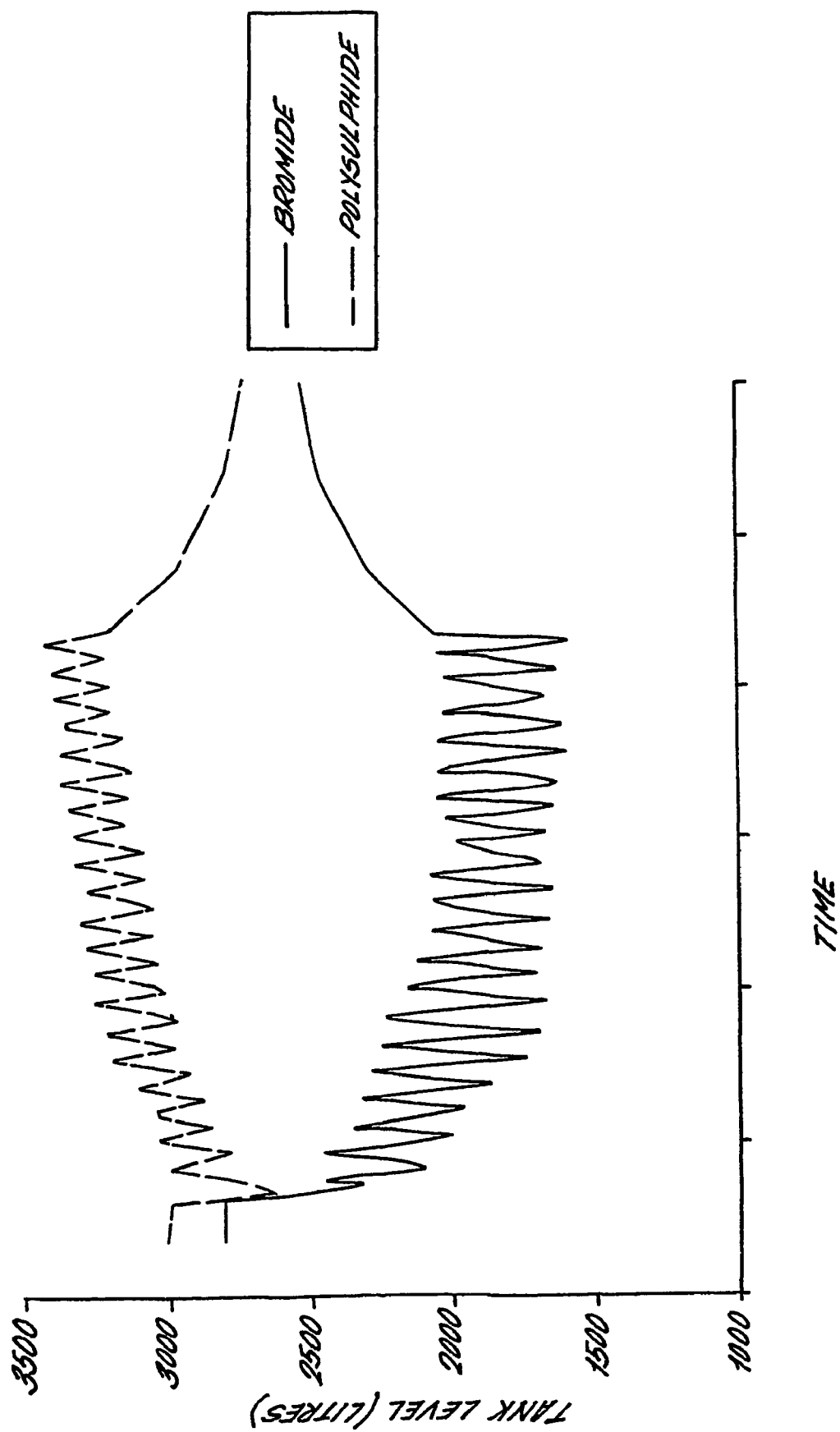
FIG. 9 is a graph showing the change in electrolyte volumes during normal operation of a bromine/bromide-sulfide/polysulfide RFC and when the process of the present invention is used.

The cell was operated for 20 cycles and the electrolyte tank levels were monitored with time. The discharged electrolytes were then pumped through the module under conditions of zero current flow. The results are illustrated in FIG. 9 which shows that during normal operation of the cell there is a net increase in the polysulfide tank levels and a net decrease in the bromine tank levels. This net change can be clearly seen despite the variations in the tank levels during each cycle. When the electrolytes are discharged and the electrolytes are pumped under conditions of zero current flow the tank levels can be seen to return to their original levels.

EXAMPLE 2

A regenerative fuel cell of the type described above with reference to FIGS. 1A, 1B and 2 having sulfide/polysulfide and bromine/bromide electrolytes was set up. The starting composition of the sulfide/polysulfide electrolyte was $Na_2S_{3.7}$ (1.3M), NaOH (1M) and NaBr (1M). The starting composition of the bromine/bromide electrolyte was NaBr (5M). The cell had the following specifications:

| Electrode material: | polyethylene impregnated with activated carbon. |
|---|---|
| Electrode area: | 5.5 $m^2$. |
| Current density: | 60 $mA/cm^2$. |
| Electrolyte volume: | 10 litres per electrolyte |
| Cycle time: | 3 hrs |
| Flow rate: | 4 l/hr |
| Membrane material: | Nafion ™ 115 |

Figure 10:
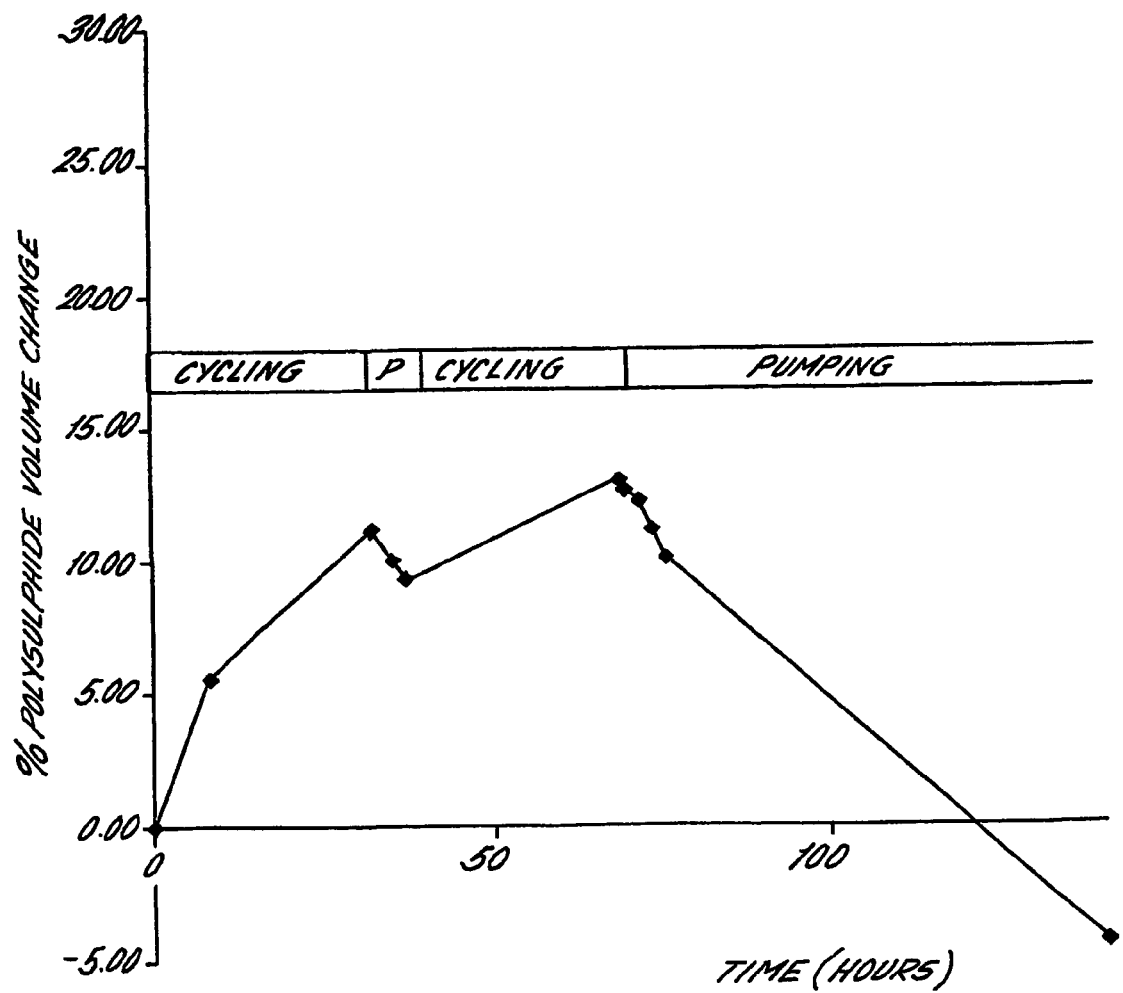
FIG. 10 is a graph showing the change in volume of the sulfide/polysulfide electrolyte during normal operation of a bromine/bromide-sulfide/polysulfide RFC and when the process of the present invention is used.

The cell was operated for approximately 11 cycles (32 to 33 hours). The discharged electrolytes were then pumped through the module under conditions of zero current flow for about 5 hours. The cell was once again operated for approximately 11 cycles (32 to 33 hours). The discharged electrolytes were then pumped through the module under conditions of zero current flow for about 72 hours. The polysulfide electrolyte tank level was monitored throughout. The results are illustrated in FIG. 10 which shows that during normal operation of the cell there is an increase in the polysulfide tank level. When the electrolytes are discharged and the electrolytes are pumped under conditions of zero current flow the polysulfide electrolyte tank level can be seen to decrease towards (and even below) its original level.

The invention claimed is:

1. An electrochemical process for energy storage and/or power delivery comprising:
   (i) maintaining and circulating electrolyte flows in a liquid system in which the active constituents are soluble in a single cell or in an array of repeating cell structures, each cell with a positive ($+^{ve}$) chamber containing a positive electrode and a negative ($-^{ve}$) chamber containing a negative electrode, the chambers being separated from one another by a cation exchange membrane, electrolyte 1 containing a sulfide circulating in the negative chamber of each cell during discharge, and electrolyte 2 containing bromine circulating in the positive chamber during discharge,
   (ii) restoring or replenishing the electrolytes in the positive and negative chambers by circulating the electrolyte from each chamber to storage means comprising a volume of electrolyte greater than the cell volume for extended delivery of power over a longer discharge cycle than the cell volume alone would permit, and
   (iii) controlling the distribution of water between the two electrolytes by a process including (a) discharging electrolyte 1, or fractions thereof, and/or discharging electrolyte 2, or fractions thereof, to such an extent that a difference in the ionic strengths of the electrolytes ensures that water will flow by osmosis from electrolyte 1 into electrolyte 2 when said electrolytes in a separate chamber are separated by a water permeable membrane and (b) circulating electrolytes 1 and 2, or fractions thereof, through the first and second chambers respectively of a separate container which is divided by a water permeable membrane, under conditions wherein no current flows in said container between electrolytes 1 and 2 such that water flows from electrolyte 1 into electrolyte 2 by osmosis to redistribute water between the electrolytes.

2. A process as claimed in claim 1 wherein the water permeable membrane is a reverse osmosis membrane or a nanofiltration membrane or a cation exchange membrane.

3. A process as claimed in claim 1 wherein step (iii) (b) of the process is carried out on a fraction of the total volume of electrolytes 1 and 2.

4. A process as claimed in claim 3 wherein step (iii) (a) of the process is carried out on a fraction of the total volume of electrolytes 1 and/or 2.

5. A process as claimed in claim 3 wherein fractions of electrolytes 1 and 2 are removed from the electrolyte flows at, or close to, the end of the discharge cycle and circulated through the first and second chambers respectively of the separate container which is divided by a water permeable membrane, under conditions wherein no current flows between electrolytes, the fractions being returned to the electrolyte flows once water is redistributed between the electrolytes.

6. A process as claimed in claim 4 wherein fractions of electrolytes 1 and 2 are removed from the electrolyte flows at any point in the charge/discharge cycle and one or both electrolytes are then discharged to provide said difference in the ionic strengths by means of an auxiliary electrochemical cell and are then circulated through the first and second chambers respectively of the separate container which is divided by a water permeable membrane, under conditions wherein no current flows between the electrolytes, the fractions being returned to the electrolyte flows once water is redistributed between the electrolytes.

7. Apparatus for carrying out a process as claimed in claim 1 further comprising:
 (i) a single cell or an array of repeating cell structures, each cell including; a positive chamber containing a positive electrode and a negative chamber containing a negative electrode, the chambers being separated from one another by an ion exchange membrane, an electrolyte 1 containing a sulfide circulating in the negative chamber of each cell during discharge, and electrolyte 2 containing bromine circulating in the positive chamber during discharge, electrolyte 2 containing bromine circulating in the positive chamber during discharge,
 (ii) storage and circulation means for each electrolyte for restoring or replenishing the electrolytes in the positive and negative chambers,
 (iii) means for controlling the distribution of water between the two electrolytes including;
 means for discharging electrolyte 1, or fractions thereof, and/or discharging electrolyte 2, or fractions thereof, to such an extent that a difference in the ionic strengths of the electrolytes ensures that water will flow by osmosis from electrolyte 1 into electrolyte 2 when said electrolytes in a separate chamber are separated by a water permeable membrane;
 a separate container which is divided into first and second chambers by a water permeable membrane; and
 means for circulating electrolytes 1 and 2, or fractions thereof, respectively, through the first and second chambers of the container, under conditions wherein no current flows in said separate container between electrolytes 1 and 2, such that water flows from electrolyte 1 into electrolyte 2 by osmosis to redistribute water between the electrolytes.

8. Apparatus as claimed in claim 7 wherein the means for discharging electrolytes 1 and/or 2, or fractions thereof, to such an extent that water will flow by osmosis from electrolyte 1 into electrolyte 2 when said electrolytes are separated by a water permeable membrane is provided by the single cell or array of repeating cell structures which forms part (i) of the apparatus.

9. Apparatus as claimed in claim 7 wherein the means for discharging electrolytes 1 and/or 2, or fractions thereof, to such an extent that water will flow by osmosis from electrolyte 1 into electrolyte 2 when said electrolytes are separated by a water permeable membrane is provided by way of an auxiliary electrochemical cell.

* * * * *